G. M. EATON.
LOCOMOTIVE FRICTION PLATE.
APPLICATION FILED NOV. 5, 1915.
1,266,565.
Patented May 21, 1918.
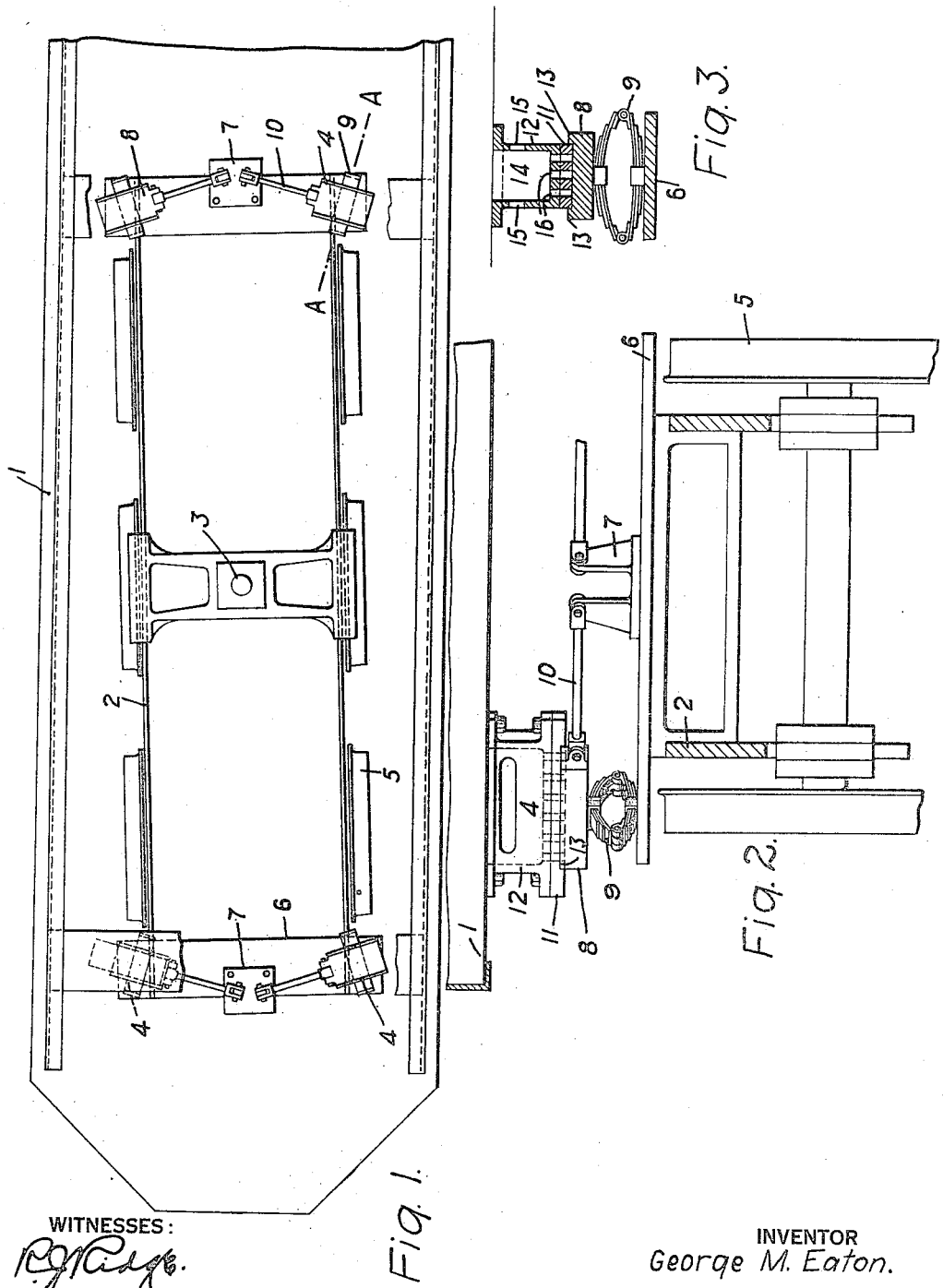
WITNESSES:
INVENTOR
George M. Eaton.
BY
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE FRICTION-PLATE.

1,266,565.  Specification of Letters Patent.  Patented May 21, 1918.

Application filed November 5, 1915. Serial No. 59,824.

*To all whom it may concern:*

Be it known that I, GEORGE M. EATON, a citizen of the United States, and a resident of Pittsburgh, in the county of Allegheny and State of Pennsylvania, have invented a new and useful Improvement in Locomotive Friction-Plates, of which the following is a specification.

My invention relates to bearings for locomotives and particularly to friction bearings for electric locomotives.

One object of my invention is to provide a locomotive with bearings of the above indicated class which will permit the trucks to adjust themselves to the curves in the track without undue wearing of the bearings.

A further object of my invention is to provide a bearing of the above indicated class which shall be resiliently mounted to permit vertical motion of the body portion of the locomotive relative to the trucks without excessive wear of the bearings.

In the usual construction of friction bearings for electric locomotives, the bearing plates are supported on springs which are disposed between a cylinder mounted on a friction plate and a plunger mounted on the truck or the body portion of the locomotive. Thus, any vertical motion to which the body portion may be subjected, relative to the trucks, will cause an excessive wearing of the plungers and cylinders which support the springs. Furthermore, the springs and friction plates are difficult to replace and to lubricate.

According to my invention, friction bearings are radially disposed, as to the pivotal bearing, between the truck and body portion of the locomotive, and each bearing embodies one resiliently mounted friction plate and one rigidly mounted friction plate coöperating with the resiliently mounted friction plate. One plate is mounted on the truck and the other plate is mounted on the body portion. The resiliently mounted friction plate may be supported on either the truck or the body portion of the locomotive by a spring and be anchored by a pivoted lever, so that the friction plate may move relative to its support in a vertical direction, but, shall move with its support in a horizontal direction. The other friction plate will be supported on a bracket member which is rigidly mounted on either the truck or the body portion of the locomotive, according to which part carries the resiliently mounted friction plate. Thus, the different parts of the bearing may be easily removed and replaced, no parts are subjected to excessive wear during the vertical movement of the body portion relative to the truck, and the bearing surfaces may be conveniently lubricated.

My invention is illustrated in the accompanying drawing in which Figure 1 is a diagrammatic plan view of a truck, with the body portion of the locomotive shown in outline around the truck which is provided with bearings constructed in accordance with my invention; Fig. 2 is a partial end elevation of a truck and one bearing, and Fig. 3 is a sectional view of one bearing, taken along the line A—A of Fig. 1.

Referring to the drawing, a locomotive is shown provided with a body portion 1, a truck 2, pivotal center bearing 3 and friction bearings 4.

The truck 2 is provided with supporting wheels 5, a bumper girder 6 and brackets 7. The pivotal center bearing 3, between the truck and body portion, may be of any well known construction and need not be described.

Each of the friction bearings 4 embodies a friction plate 8, a spring 9 mounted between the bumper girder 6 and the plate 8, and a link 10 pivotally connecting the friction plate 8 to bracket 7. Coöperating with the friction plate 8 is a second friction plate 11 supported by a member 12 which is rigidly mounted on the body portion 1 of the locomotive. The friction plate 8 is provided with a seat for the spring 9 and is preferably made of steel, with flanges 13 between which the plate 11 may travel. The friction plate 11 is preferably made of cast iron. The materials above specified for the friction plates are not essential to my invention but may be replaced by any other suitable materials, if desired.

The bracket member 12 which supports the friction plate 11 has a chamber 14 provided with openings 15 in the side walls thereof. The base of the bracket member 12 and the friction plate 11 are provided with perforations 16 through which oil may flow from the chamber 14 to lubricate the bearing surfaces of the plates 8 and 11.

In the drawing, spring 9 is represented as a leaf spring, but such a structure is not essential to my invention, and, if so desired, a coil spring may be used in place of the leaf spring. It may also be noted that the mounting of the friction plates 8, springs 9, levers 10 and brackets 7 on the truck 2, and the mounting of the friction plates 11 on the body portion 1 are not essential to my invention and, if desired, plates 8, springs 9, levers 10 and brackets 7 may be mounted on the body member 1 and the plates 11 on the truck 2.

In operating the locomotive, the truck 2 will move, relative to the body portion of the locomotive, at every curve in the track, with the pivotal bearing 3 as a center of rotation. The weight of the locomotive is not carried by the pivotal bearing 3, but by the friction bearings 4, which are radially disposed as to the pivotal bearing. Thus, whenever the truck 2 turns on the bearing 3, the plates 8 and 11 move relative to each other while supporting the body member upon the truck. If there is a movement of the body member in a vertical direction relative to the truck, the spring 9 will maintain the plate 8 in contact with the plate 11 and will allow the plate 8 to follow such movement of the body member 1. The link 10, which causes the plate 8 to follow the horizontal movement of the truck 2, should lie in a horizontal plane, as shown, when the truck and the body member are in their normal positions, so that the above mentioned vertical movement of the plate 8 will cause a negligible shifting of this plate in a horizontal direction.

Oil and waste may be supplied to the chamber 14 through the openings 15 and the oil, after filtering through the waste, will pass through perforations 16 in the base of the member 12 and plate 11 to lubricate the bearing surfaces of the friction plates 8 and 11. The bracket member 12 and the plate 11 are preferably made longer than the plate 8, when the parts are arranged as illustrated, in order to prevent an unnecessary accumulation of dirt on the bearing surfaces.

In the drawing, my invention has been illustrated by a truck provided with four friction bearings spaced equal distances from the center bearing, but such structure is not material to my invention, and any number of friction bearings which are located at various distances from the center bearing may be used, if desired.

Obviously, my invention is not restricted to the specific structural details in the arrangement and location of parts shown and described, as the benefits thereof may be secured by means of structures differing materially therefrom but making no departure from the scope and spirit of my invention. I desire, therefore, that only such limitations shall be imposed as are indicated in the appended claims.

I claim as my invention:

1. In a locomotive, the combination with a body portion, a truck and a pivotal bearing between said truck and said body portion, of bearings radially disposed relative to said pivotal bearing and each embodying a friction plate mounted on said body portion, a friction plate resiliently mounted on said truck and coöperating with said first-mentioned friction plate and a link pivotally connecting said resiliently mounted friction plate to said truck.

2. In a locomotive, the combination with a body portion and a truck, of a friction bearing embodying a friction plate resiliently mounted on said truck, a link pivotally connecting said friction plate to said truck, a second friction plate coöperating with the first-mentioned friction plate, and a bracket member supporting said second friction plate on the body portion of the locomotive.

3. In a locomotive, the combination with a body portion, a truck and a pivotal bearing between said truck and said body portion, of bearings radially disposed relative to said pivotal bearing and embodying friction plates mounted on the truck and on the body portion of the locomotive and means comprising a pivoted member for restraining one of said plates from movement in a horizontal direction relative to its supporting member.

4. In a locomotive, the combination with a body portion, a truck and a pivotal bearing between said truck and said body portion, of bearings radially disposed relative to said pivotal bearing and each embodying coöperating friction plates mounted on said body portion and on said truck, one of said plates being resiliently mounted and the other rigidly mounted, and a link pivotally connecting the resiliently mounted plate to the member supporting the plate.

5. In a locomotive, the combination with a body portion, a truck and a pivotal bearing between said truck and said body portion, of four bearings radially disposed relative to said pivotal bearing and embodying friction plates resiliently mounted on said truck, links pivotally joining said friction plates to said truck and friction plates rigidly mounted on the body portion of the locomotive to coöperate with the friction plates mounted on the truck.

6. In a locomotive, the combination with a body portion, a truck including a bumper girder and a pivotal bearing between said truck and said body portion, of bearings radially disposed relative to said pivotal bearing and each embodying a friction plate resiliently mounted on said bumper girder, a link pivotally connected to said bumper girder and to said friction plate for allowing said friction plate to move in a vertical direction but restricting the movement in a horizontal direction, and a friction plate mounted on said body portion and coöperating with the first-mentioned friction plate.

7. In a locomotive, the combination with a body portion, a truck and a pivotal bearing between said truck and said body portion, of bearings radially disposed relative to said pivotal bearing and each embodying a friction plate resiliently mounted on the truck, a bracket member rigidly mounted upon the body portion and having an oil-and-waste chamber provided with openings in its bottom and sides, and a perforated friction plate coöperating with the first-mentioned friction plate and rigidly mounted on the base of said bracket member.

8. In a locomotive, the combination with a body portion, a truck and a pivotal bearing between said truck and said body portion, of bearings radially disposed relative to said pivotal bearing and each embodying a friction plate mounted on said truck, a bracket member having an oil-and-waste chamber and mounted on said body portion, a friction plate mounted on the bracket member and coöperating with the first-mentioned friction plate, and means for lubricating the bearing surfaces of the friction plates by oil supplied from the chamber of said bracket member.

9. In a vehicle, the combination with a truck having a body portion mounted thereon, of two coöperating friction plates respectively mounted on said body portion and on said truck, one of said plates being rigidly mounted on its supporting member, and means for restraining the movement of the second plate in a horizontal direction relative to its supporting member but permitting the same to move vertically and to tilt about a point intermediate its ends.

10. In a vehicle, the combination with a truck and a body portion mounted thereon, of two coöperating friction plates respectively mounted on said truck and on said body portion, and means comprising a pivoted member for restraining one of said plates from movement in a horizontal direction relative to its supporting member.

11. In a vehicle, the combination with a body portion and a truck, of bearings radially disposed relative to the center of said truck and each embodying coöperating friction plates respectively mounted on said body portion and on said truck, one of said plates being resiliently mounted and the other rigidly mounted, and a link pivotally connecting the resiliently mounted plate to the member supporting the plate, said link restraining the horizontal movement of the plate to which it is connected.

12. In a vehicle, the combination with a body portion and a truck, of friction bearings embodying a friction plate resiliently mounted on said truck, a link pivotally connecting said friction plate to said truck, and a second friction plate coöperating with the first-mentioned friction plate and mounted on the body portion of the vehicle.

13. In a vehicle, the combination with a body member and a truck member, of a friction bearing between said members comprising a friction plate secured to one of said members, a bracket secured to the other member, a second friction plate, a spring on said other member for resiliently supporting said second plate in operative relation to the first plate, and a link pivotally connected to said bracket and to said second plate to restrain the horizontal movement of the latter but permitting the same to move vertically relative to its support and to tilt about a point intermediate its ends.

14. In a vehicle, the combination with a truck member, of a body member supported thereon, and friction bearings between said members comprising a friction plate, a link pivotally connected to said plate and also pivotally connected to one of said members, and a second friction plate mounted in operative relation to the first mentioned plate, one of said friction plates being supported by said body member and the other being supported by said truck member.

In testimony whereof, I have hereunto subscribed my name this 28th day of Oct. 1915.

GEORGE M. EATON.

Copies of this patent may be obtained for five cents each, by addressing the "Commissioner of Patents, Washington, D. C."